March 4, 1958  L. C. PETERSON ET AL  2,825,382
PNEUMATIC TIRE
Filed March 12, 1954
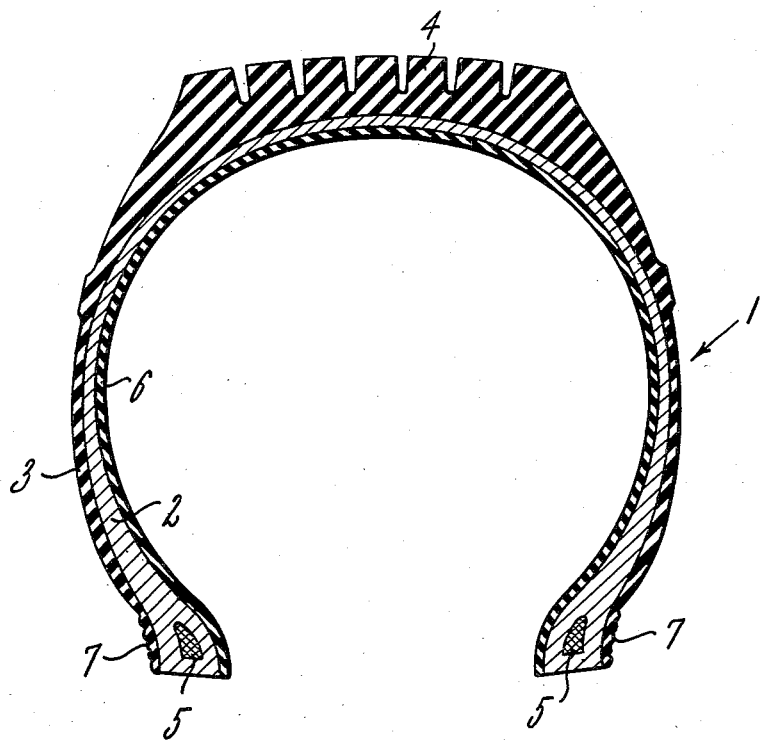
INVENTORS
L. C. PETERSON
H. J. BATTS
BY Robert J. Patterson
ATTORNEY

United States Patent Office 2,825,382
Patented Mar. 4, 1958

2,825,382

PNEUMATIC TIRE

Lester C. Peterson and Harvey J. Batts, Indianapolis, Ind., assignors to United States Rubber Company, New York, N. Y., a corporation of New Jersey Application March 12, 1954, Serial No. 415,864

5 Claims. (Cl. 152—330)

This invention relates to a pneumatic rubber tire of the "tubeless" type, and more particularly to the air retaining liner in such a tire.

Recently there has been considerable interest in tubeless tires, that is, pneumatic rubber tires having a conventional carcass, sidewalls and tread but embodying an air retaining liner secured to the inside of the carcass and serving to replace the conventional inner tube. The provision of a liner which is completely satisfactory from every viewpoint has been a serious problem. The difficulties encountered with liners have involved the securing of the necessary degree of adhesion of the liner to the carcass and the poor physical properties of many of the liners which have been made heretofore. Many of the liners being used at the present time have been only slightly cured. The reason for the slight degree of cure of the liner stock was that this was found necessary in order to secure good adhesion and good flex characteristics in service. If the liners were cured more fully, incompatibility between the liner and the rubber of the carcass developed resulting in lack of adhesion and poor flex life. The difficulty with the slightly cured liner stocks was that although they exhibited good adhesion and good flex life they had extremely poor physical characteristics so that they were easily damaged in the factory or in service.

The present invention has for its object the provision of a tubeless tire liner which exhibits unusually good adhesion to the rubberized carcass of the tire even though the liner stock is fully cured. Another object is to provide such a liner stock which exhibits physical characteristics far superior to those of tubeless tire liners heretofore employed commercially.

The single figure of the accompanying drawing is a cross-sectional view of a pneumatic rubber tire of the tubeless type embodying a liner made in accordance with our invention.

Our invention is based upon the discovery that important new results and advantages are achieved by making liners for pneumatic rubber tires of the tubeless type from a vulcanized mixture of polyisobutylene and either natural rubber or butadiene-styrene rubbery copolymer (GR–S). More specifically, we form our liner of a mixture comprising polyisobutylene having an average molecular weight of at least 80,000 and usually not over 400,000, and natural rubber or GR–S in relative proportions of from 50 to 70% of the polyisobutylene and correspondingly from 50 to 30% of the natural rubber or GR–S, these percentages being by weight based on the sum of these two ingredients.

In making a tubeless tire in accordance with our invention, we prepare a mixture of the polyisobutylene and natural rubber or GR–S, together with vulcanizing ingredients for the natural rubber or GR–S, and convert this vulcanizable mixture into the form of a liner which we then assemble with the unvulcanized tire components with the unvulcanized liner element adjacent to the innermost rubber-coated fabric ply of the tire carcass (this ply usually being coated on both sides with natural rubber or GR–S or a mixture thereof) after which the assembly is vulcanized in the usual way so as to vulcanize all of the elements of the tire including the liner element. During this vulcanization the liner is vulcanized to the interior of the tire carcass, the liner being integrally secured to and coalesced with the inner rubber coating on the innermost ply of the carcass.

As a result of making the liner of the aforementioned mixture of polyisobutylene and natural rubber or GR–S, there is obtained a liner that adheres perfectly to the rubberized inner ply of the carcass without the necessity of using an adhesive between the liner and the carcass. In addition, it is possible to fully cure the natural rubber or GR–S component of the liner and thereby to obtain excellent physical properties. The quality of the resulting liner is the highest yet attained in tubeless tire liners and is far better than the quality of the liners now being commercialized. In addition the air retention properties of the liner are extremely good, closely approaching those of all-Butyl rubber liners.

The relative proportions of polyisobutylene and natural rubber or GR–S used in practicing our invention are critical. If much less than 50% of polyisobutylene is used in the mixture the air retention properties are seriously impaired. On the other hand, if much more than 70% of polyisobutylene is used the physical properties of the liner, especially resistance to flex cracking, are seriously impaired.

In practicing our invention we prefer to use natural rubber in conjunction with the polyisobutylene. Instead of natural rubber, we can use butadiene-styrene rubbery copolymer but the physical properties of the resulting liner are not as good as when natural rubber is used.

In practicing our invention we generally employ polyisobutylene having a molecular weight of at least 80,000 but not over 150,000. In other words, we generally employ polyisobutylene of intermediate molecular weight. The polyisobutylene used in practicing our invention is an elastic rubbery solid, usually pale in color, and greatly resembling pale crepe rubber in appearance.

An intimate mixture of the polyisobutylene and the natural rubber or GR–S in the proportions indicated above, together with compounding ingredients is made in any suitable manner, as on an open rubber mill or in a Banbury mixer, after which the mixture is shaped into a continuous body having the desired liner form whereupon this liner body is built into the tire in the manner described above. The compounding ingredients will embody a vulcanizing agent, almost invariably sulfur, and suitable accelerators and other compounding ingredients in amounts such as to cure the natural rubber or GR–S component of the liner.

The liner stock will also embody a suitable proportion of a filler or pigment. Typically we use carbon black in amount ranging from 30 to 60 parts per 100 parts of polyisobutylene and natural rubber or GR–S. Any of the carbon blacks commonly used in the rubber industry can be used. Examples are channel blacks, furnace blacks (made from oil or gas) and so-called "thermal blacks" which are made by thermal decomposition of natural gas. The thermal blacks are preferred because they impart superior resistance to flex cracking. Examples are the "fine thermal blacks" such as "P–33" and "medium thermal blacks" such as "Thermax."

Referring to the drawing, there is portrayed a pneumatic tire casing 1 comprised of a multi-ply rubberized fabric carcass 2 having overlying rubber sidewall and tread portions 3 and 4, respectively. Inextensible bead assemblies 5 are incorporated in the lower marginal portions of the carcass. A liner element 6, formed of a mixture of polyisobutylene and natural rubber or GR–S in accordance with our invention is securely attached to the entire inner portion of the carcass, preferably by vulcanization in situ while being pressed, in any suitable way as by means of the conventional curing bag, against the innermost rubberized fabric layer of the carcass during vulcanization of the tire in the factory. Preferably the outer sidewall portion of the bead is formed with a plurality of circumferential ridges 7 which aid in insuring a truly air-tight seating against the wheel rim. If desired, auxiliary sealant means in addition to ridges 7, can be provided to seal the tire with respect to the rim but neither ridges 7 nor such auxiliary sealant means constitute any part of our invention.

By reason of the perfect compatibility of the stock used in the liner of our invention and the rubber stock used in the assembly of the tire carcass, an integral union of our liner with the rubber layer over the entire inside portion of the tire carcass is effected during the vulcanization. This effects a remarkably good adhesion of our liner to the tire carcass and greatly simplifies the manufacture of tubeless tires having a liner of extremely high physical qualities coupled with excellent air retention properties.

The following examples illustrate our invention in more detail. All parts and percentages expressed herein are by weight.

Example 1

The ingredients shown in the following table are intimately mixed together in the ordinary way after which the mixture is sheeted out to suitable thickness. The liner is formed from the resulting sheet. A tire embodying the liner is assembled and vulcanized in the conventional manner described above. The resulting liner exhibits air retention properties almost as good as an all-butyl rubber liner. The excellent physical properties of the resulting liner is indicated by the physical data given below the formulation.

|  | Parts |
|---|---|
| "Vistanex B-100" (polyisobutylene, molecular weight 100,000) | 60.00 |
| No. 1 smoked sheet natural rubber | 40.00 |
| "P-33" (carbon black) | 45.00 |
| Zinc oxide | 3.00 |
| Stearic acid | 1.00 |
| Benzothiazyl disulfide (accelerator) | .35 |
| Tetramethylthiuram monosulfide (accelerator) | .10 |
| Sulfur | .75 |
| #8 oil (mineral oil) | 5.00 |

|  | Cure at 320° F., minutes |  |
|---|---|---|
| Tensile | 5 | 1,045. |
|  | 10 | 1,130. |
|  | 15 | 1,110. |
|  | 30 | 1,140. |
|  | 45 | 1,100. |
| Elongation | 5 | 730. |
|  | 10 | 750. |
|  | 15 | 780. |
|  | 30 | 800. |
|  | 45 | 750. |
| 300% Modulus | 5 | 180. |
|  | 10 | 190. |
|  | 15 | 185. |
|  | 30 | 230. |
|  | 45 | 185. |
| 500% Modulus | 5 | 435. |
|  | 10 | 465. |
|  | 15 | 480. |
|  | 30 | 480. |
|  | 45 | 460. |
| Hardness | 5 | 40. |
|  | 10 | 42. |
|  | 15 | 43. |
|  | 30 | 43. |
|  | 45 | 42. |
| Flex, Demattia [1] | 15 | No change or hole growth in 200,000 cycles. |
|  | 30 |  |
|  | 45 |  |

[1] In this test (ASTMD 813–44 T), which was performed with the most recent type of De Mattia flex equipment, the grooved specimen was perforated in the center with a needle. The growth of the hole was observed and recorded at regular intervals.

Example 2

The formulation is identical with that given in Example 1 except that the natural rubber is replaced with an equal weight of GR-S ("GR-S 1500"), the levels of sulfur and accelerators were:

| | |
|---|---|
| Benzothiazyl disulfide | .20 |
| Tetramethylthiuram monosulfide | .20 |
| Sulfur | .80 | and the formulation included 2.00 parts of zinc laurate ("Laurex"). The data on this stock was as follows:

|  | Cure at 320° F., minutes |  |
|---|---|---|
| Tensile | 5 | 395 |
|  | 10 | 580 |
|  | 15 | 620 |
|  | 30 | 630 |
|  | 45 | 605 |
| Elongation | 5 | 940 |
|  | 10 | 600 |
|  | 15 | 600 |
|  | 30 | 570 |
|  | 45 | 510 |
| 300% Modulus | 5 | 145 |
|  | 10 | 305 |
|  | 15 | 315 |
|  | 30 | 340 |
|  | 45 | 370 |
| 500% Modulus | 5 | 210 |
|  | 10 | 465 |
|  | 15 | 475 |
|  | 30 | 525 |
|  | 45 | 580 |
| Hardness | 5 | 39 |
|  | 10 | 47 |
|  | 15 | 47 |
|  | 30 | 48 |
|  | 45 | 48 |

| Flex-Cycles (same test as in Example 1) | 15 minute cure | 30 minute cure | 45 minute cure |
|---|---|---|---|
| 32,034 | 0 | .04 | 0 |
| 43,030 | 0 | .06 | 0 |
| 52,720 | 0 | .07 | 0 |
| 101,000 | 0 | .18 | 0 |
| 180,000 | 0 | .20 | .22 |
| 200,000 | 0 | .22 | .24 |

From the foregoing description, many advantages of our invention will be apparent to those skilled in the art. A very important advantage is that the liners of our invention present no problem of adhesion to the ordinary rubber-coated innermost ply of the tire carcass. Since the air retention properties of our liners closely approach those of all-Butyl rubber liners without presenting the serious problem of adhering such Butyl rubber liners to the tire carcass, our invention provides nearly the ideal solution to the problem of adhesion of tubeless tire liners. In U. S. patent to Antonson 2,587,428 the problem of adhesion of an all-Butyl rubber liner was solved by rubberizing only the outer side of the innermost ply of cord, leaving the inner face thereof uncoated so that during vulcanization the Butyl rubber liner adhered directly to the uncoated innermost fabric ply. By the present invention, resort to such means for obtaining the necessary bond between the liner and the tire carcass is obviated. Another very important advantage of our invention is the fact that the physical characteristics of our liners are extremely good so that the resulting liner is far less susceptible to injury in the factory and stands up unusually well in service.

Having thus described our invention, what we claim and desire to protect by Letters Patent is:

1. A vulcanized tubeless pneumatic rubber tire comprising a multi-ply rubberized fabric carcass with surrounding sidewall and tread portions and having an interior air-retaining liner secured directly to its innermost ply by vulcanization in situ, said liner extending over substantially the entire inner portion of said carcass and being formed of a continuous body of a vulcanized mixture comprising about 0.8 part by weight of sulfur and 100 parts by weight of a mixture of elastic rubbery polyisobutylene having an average molecular weight of at least 80,000 but not over 400,000 and an elastomer selected from the group consisting of natural rubber and butadiene-styrene rubbery copolymer in relative proportions of from 50 to 70% of said polyisobutylene and correspondingly from 50 to 30% of said elastomer, said percentages being by weight based on the sum of said polyisobutylene and said elastomer, said liner having good air retention properties, having high resistance to flex-cracking and exhibiting substantially no hole growth in 100,000 flex-cycles in the De Mattia flex test.

2. A tire as recited in claim 1 wherein said mixture contains from 30 to 60 parts by weight of carbon black per 100 parts by weight of said polyisobutylene and said elastomer.

3. A vulcanized tubeless pneumatic rubber tire comprising a carcass formed with plies of fabric coated with rubber selected from the group consisting of natural rubber and butadiene-styrene rubbery copolymer, said carcass having surrounding sidewall and tread portions, the innermost ply being coated on its inside face with rubber selected from said group, and an interior air retaining liner integrally secured and coalesced with the inner rubber coating on said innermost ply by vulcanization in situ, said liner extending over substantially the entire inner portion of said carcass and being formed of a continuous body of a vulcanized mixture comprising about 0.8 part by weight of sulfur and 100 parts by weight of a mixture of an elastic rubbery polyisobutylene having an average molecular weight of at least 80,000 but not over 400,000 and an elastomer selected from the group consisting of natural rubber and butadiene-styrene rubbery copolymer in relative proportions of from 50 to 70% of said polyisobutylene and correspondingly from 50 to 30% of said elastomer, said percentages being by weight based on the sum of said polyisobutylene and said elastomer, said liner having good air retention properties, having high resistance to flex-cracking and exhibiting substantially no hole in growth in 100,000 flex-cycles in the De Mattia flex test.

4. A vulcanized tubeless pneumatic rubber tire comprising a carcass formed with plies of fabric coated with rubber selected from the group consisting of natural rubber and butadiene-styrene rubbery copolymer, said carcass having surrounding sidewall and tread portions, the innermost ply of fabric being coated on its inside face with rubber selected from said group, and an interior air retaining liner integrally secured and coalesced with the inner rubber coating on said innermost ply by vulcanization in situ, said liner extending over substantially the entire inner portion of said carcass and being formed of a continuous body of a vulcanized mixture comprising 0.8 part by weight of sulfur and 100 parts by weight of a mixture of elastic rubbery polyisobutylene having an average molecular weight of at least 80,000 but not over 400,000 and natural rubber in relative proportions of from 50 to 70% of said polyisobutylene and correspondingly from 50 to 30% of said natural rubber, said percentages being by weight based on the sum of said polyisobutylene and said natural rubber, said liner having good air retention properties, having high resistance to flex-cracking and exhibiting substantially no hole growth in 100,000 flex-cycles in the De Mattia flex test.

5. The process of making a tubeless pneumatic tire which comprises assembling the elements of a tire carcass formed with plies of fabric coated with rubber selected from the group consisting of natural rubber and butadiene-styrene rubbery copolymer, the innermost ply being coated on its inside face with rubber selected from said group, disposing adjacent to said inside face a continuous sheet of unvulcanized liner stock comprising 0.8 part by weight of sulfur and 100 parts by weight of a mixture of elastic rubbery polyisobutylene having an average molecular weight of at least 80,000 but not over 400,000 and an elastomer selected from the group consisting of natural rubber and butadiene-styrene rubbery copolymer in relative proportions of from 50 to 70% of said polyisobutylene and correspondingly from 50 to 30% of said elastomer, said percentages being by weight based on the sum of said polyisobutylene and said elastomer, said liner stock containing vulcanizing ingredients for said elastomer, said sheet extending over substantially the entire inner portion of said carcass, and vulcanizing the assembly and thereby causing the vulcanized liner stock to tenaciously adhere to the inside face of the carcass and form a liner having good air retention properties, having high resistance to flex-cracking and exhibiting substantially no hole growth in 100,000 flex-cycles in the De Mattia flex test.

References Cited in the file of this patent

UNITED STATES PATENTS

| | | |
|---|---|---|
| 2,218,167 | Harkins | Oct. 15, 1940 |
| 2,451,865 | O'Brien | Oct. 19, 1948 |
| 2,566,328 | Hessney et al. | Sept. 4, 1951 |
| 2,566,384 | Tilton | Sept. 4, 1951 |
| 2,698,042 | Perkins | Dec. 28, 1954 |

FOREIGN PATENTS

| | | |
|---|---|---|
| 1,020,822 | France | Nov. 26, 1952 |

(Corresponding U. S., 2,676,636 Apr. 27, 1954)